(12) United States Patent
Enge et al.

(10) Patent No.: US 7,652,717 B2
(45) Date of Patent: Jan. 26, 2010

(54) WHITE BALANCE CORRECTION IN DIGITAL CAMERA IMAGES

(75) Inventors: Amy D. Enge, Spencerport, NY (US); James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 602 days.

(21) Appl. No.: 11/032,902

(22) Filed: Jan. 11, 2005

(65) Prior Publication Data

US 2006/0152603 A1 Jul. 13, 2006

(51) Int. Cl.
*H04N 5/222* (2006.01)
(52) U.S. Cl. ...................................... 348/371
(58) Field of Classification Search .................. 348/234, 348/239, 223.1, 199, 370, 371; 382/199
See application file for complete search history.

(56) References Cited

U.S. PATENT DOCUMENTS

| | | | | |
|---|---|---|---|---|
| 5,258,803 A | * | 11/1993 | Hayakawa | 396/123 |
| 5,583,397 A | * | 12/1996 | Ogawa | 315/151 |
| 5,801,773 A | | 9/1998 | Ikeda | |
| 6,243,133 B1 | | 6/2001 | Spaulding et al. | |
| 6,791,606 B1 | | 9/2004 | Miyano | |
| 7,027,662 B2 | * | 4/2006 | Baron | 382/275 |
| 7,403,654 B2 | * | 7/2008 | Wu et al. | 382/167 |
| 2002/0122120 A1 | | 9/2002 | Hsieh | |
| 2002/0130953 A1 | * | 9/2002 | Riconda et al. | 348/115 |
| 2003/0081836 A1 | * | 5/2003 | Averbuch et al. | 382/199 |
| 2003/0098916 A1 | | 5/2003 | Noguchi | |
| 2003/0133021 A1 | * | 7/2003 | Hamamura et al. | 348/229.1 |
| 2003/0189664 A1 | * | 10/2003 | Olsson | 348/365 |
| 2004/0070778 A1 | * | 4/2004 | Matama | 358/1.9 |
| 2005/0041121 A1 | * | 2/2005 | Steinberg et al. | 348/239 |
| 2005/0122409 A1 | * | 6/2005 | Takeshita | 348/223.1 |
| 2005/0151855 A1 | * | 7/2005 | Kim | 348/223.1 |
| 2005/0248664 A1 | * | 11/2005 | Enge | 348/222.1 |
| 2006/0008171 A1 | * | 1/2006 | Petschnigg et al. | 382/254 |
| 2006/0050335 A1 | | 3/2006 | Dorrell et al. | |

* cited by examiner

*Primary Examiner*—Tuan Ho
*Assistant Examiner*—Kent Wang
(74) *Attorney, Agent, or Firm*—Raymond L. Owens (57) ABSTRACT

A method of enhancing a digital image produced by a digital imaging device, includes using the digital imaging device to capture at least two original digital images of the same scene with each digital image being under two different lighting conditions and producing for each such digital images a plurality of pixels; using the pixel values of at least two of the captured digital images under different lighting conditions to produce difference values; and modifying the pixel values of the original digital image in response to the corresponding difference values.

4 Claims, 10 Drawing Sheets

WHITE BALANCE CORRECTION IN DIGITAL CAMERA IMAGES

FIELD OF THE INVENTION

The invention relates generally to the field of digital image processing, and in particular to white balance correction for use in electronic still cameras, video cameras or the like.

BACKGROUND OF THE INVENTION

Video cameras and digital still cameras have employed auto white balancing adjustment with the aim of reproducing a white subject so that it looks white. There are many examples of automated prior art in this field.

U.S. Pat. No. 5,801,773 (Ikeda) teaches performing white balance using averages of groups of pixels (paxels) that fall within a broadened color temperature axis region in a color difference space and are confined to spatial regions of the image corresponding to user mode settings, e.g., landscape, portrait, etc. The shape of the color temperature axis region is also modified (usually reduced) by the user mode settings.

U.S. Pat. No. 6,243,133 (Spaulding, et al.) teaches producing a paxelized version of the image to be scene balanced, transforming said paxelized image into a gamut-preserving version of CIE XYZ space, computing the equivalent scene balance correction triplet, and back-transforming the triplet into the original camera RGB space so that it can be applied directly to the full-resolution original image to produce a scene-balanced image in a gamut-preserving CIE XYZ space suitable for subsequent output rendering.

U.S. Pat. No. 6,791,606 (Miyano) teaches producing a paxelized image and converting it into a color difference space. The distance of each paxel in the color difference space from predefined light source regions is then computed and treated as a reliability value. (The farther the paxel is from a given illuminant, the less reliable is the conclusion that that paxelized region is illuminated by said illuminant.) The associated white balance corrections for each illuminant are blended using the reliability values to produce a global white balance correction.

U.S. Patent Application Publication No. 2002/0122120 (Hsieh) teaches segmenting the image into a number of regions and computing average color difference coordinates for each region. For regions with moderate values of luminance, the average color difference values are plotted in color difference space and each quadrant of the plot examined. Only points landing in the quadrant with the majority of plotted points are used for computing the global white balance correction.

A significant problem with existing white balance correction methods is that they do not correctly balance a scene that is exposed with two different illuminants (e.g., flash and tungsten).

SUMMARY OF THE INVENTION

It has been found that by using a digital imaging device to capture at least two original digital images of the same scene with each digital image being under two different lighting conditions and producing for each such digital images a plurality of pixels; using the pixel values of at least two of the captured digital images under different lighting conditions to produce difference values; and modifying the pixel values of the original digital image in response to the corresponding difference values, that the white balance of the image from the digital camera can be more effectively corrected.

It is a feature of the present invention that it provides an improved, automatic, computationally efficient way to correct the white balance of an image from the digital camera that was exposed with more than one illuminant.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
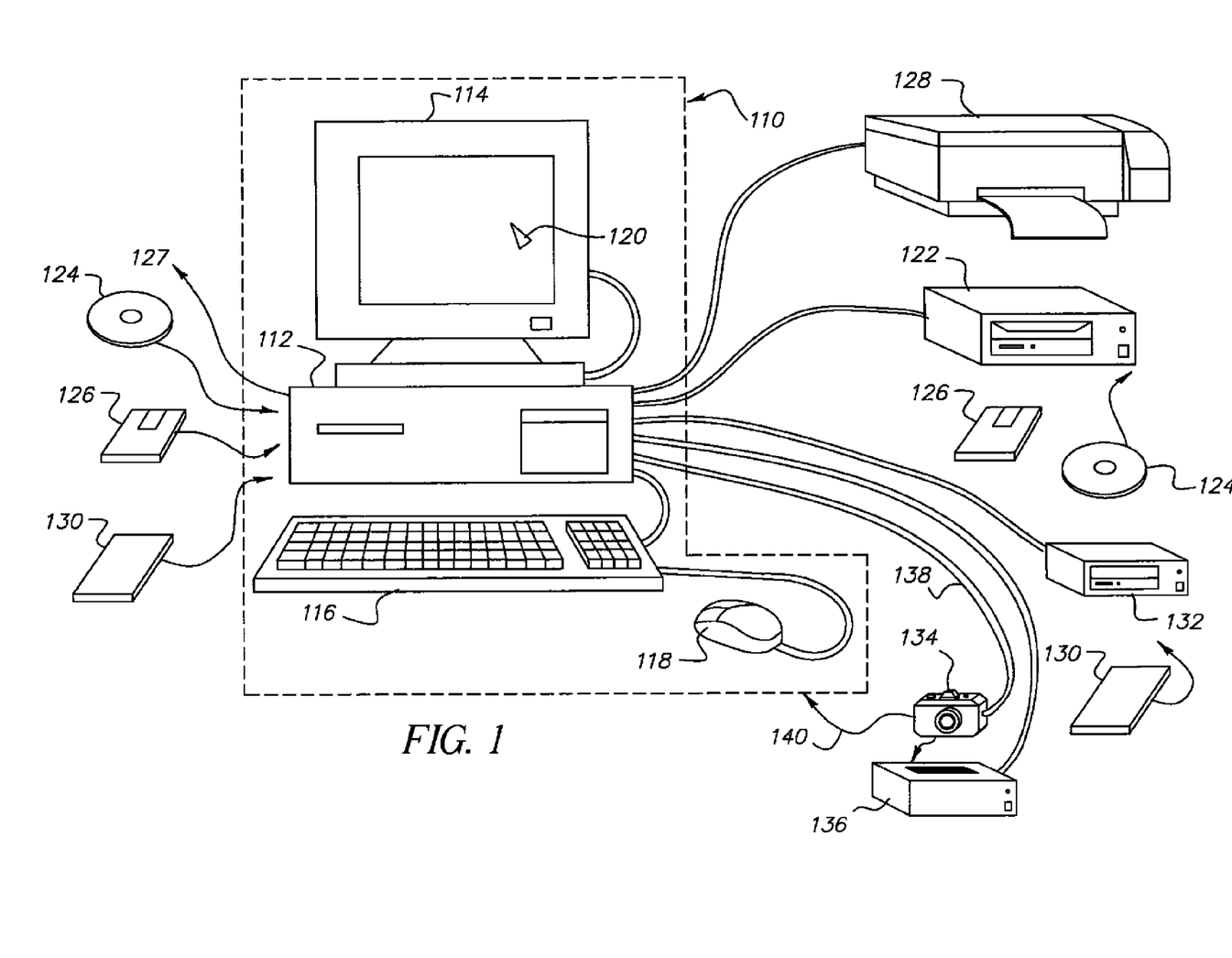
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit 112 for providing a means of inputting the software programs and other information to the microprocessor based unit 112. In addition, a floppy disk 126 can also include a software program, and is inserted into the microprocessor-based unit 112 for inputting the software program. The CD-ROM 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the CD-ROM 124, the floppy disk 126, or the network connection 127. Any images stored in the PC card 130, the floppy disk 126 or the CD-ROM 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to correct white balance in images.

Figure 2:
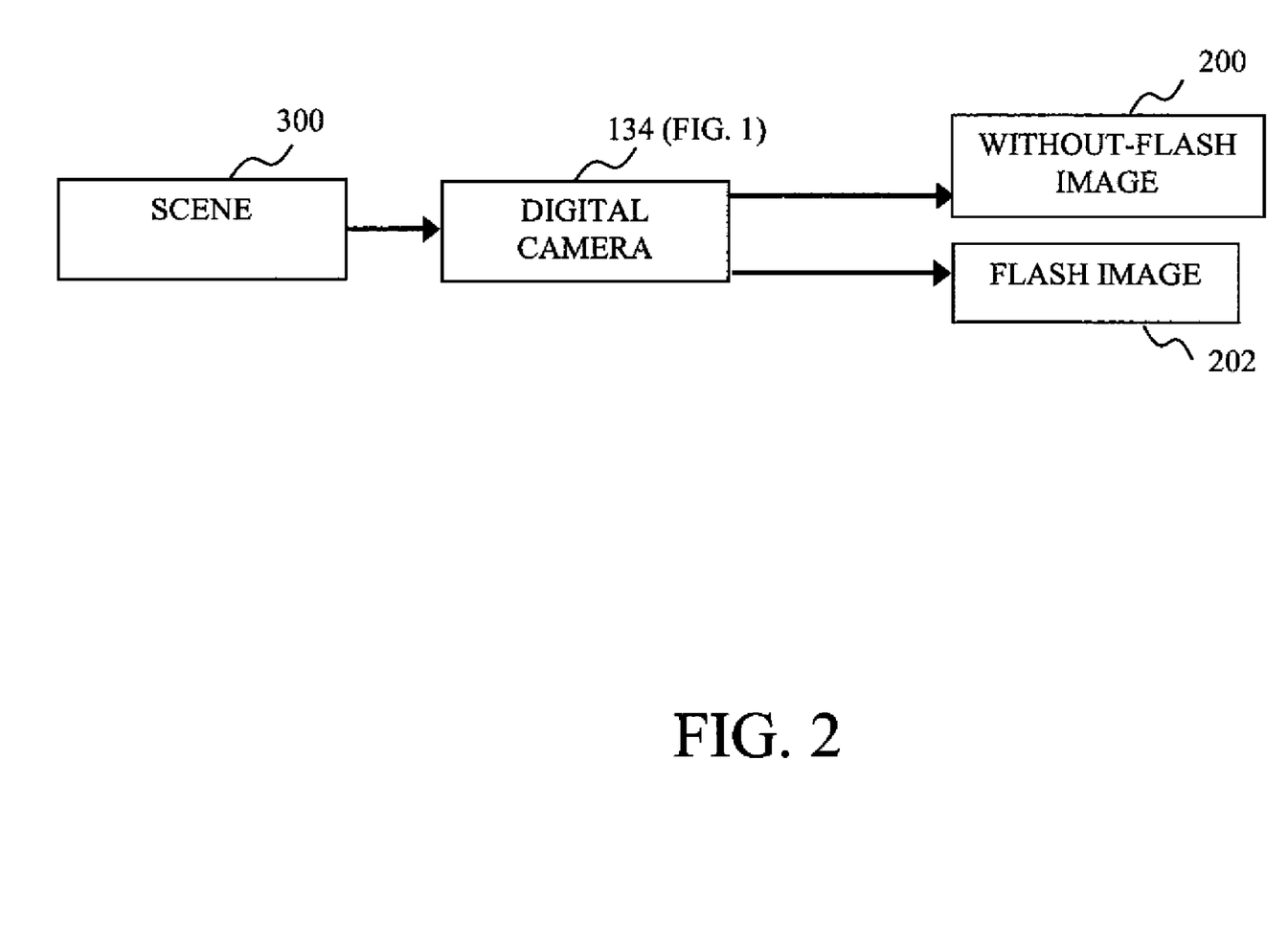
FIG. 2 is a block diagram showing the flash and without-flash images captured by the digital camera.

In FIG. 2, the digital camera 134 is responsible for creating an original flash image 202 and without-flash image 200 in a primary-color space from the scene 300. Examples of typical primary-color spaces are red-green-blue (RGB) and cyan-magenta-yellow (CMY).

Figure 3:
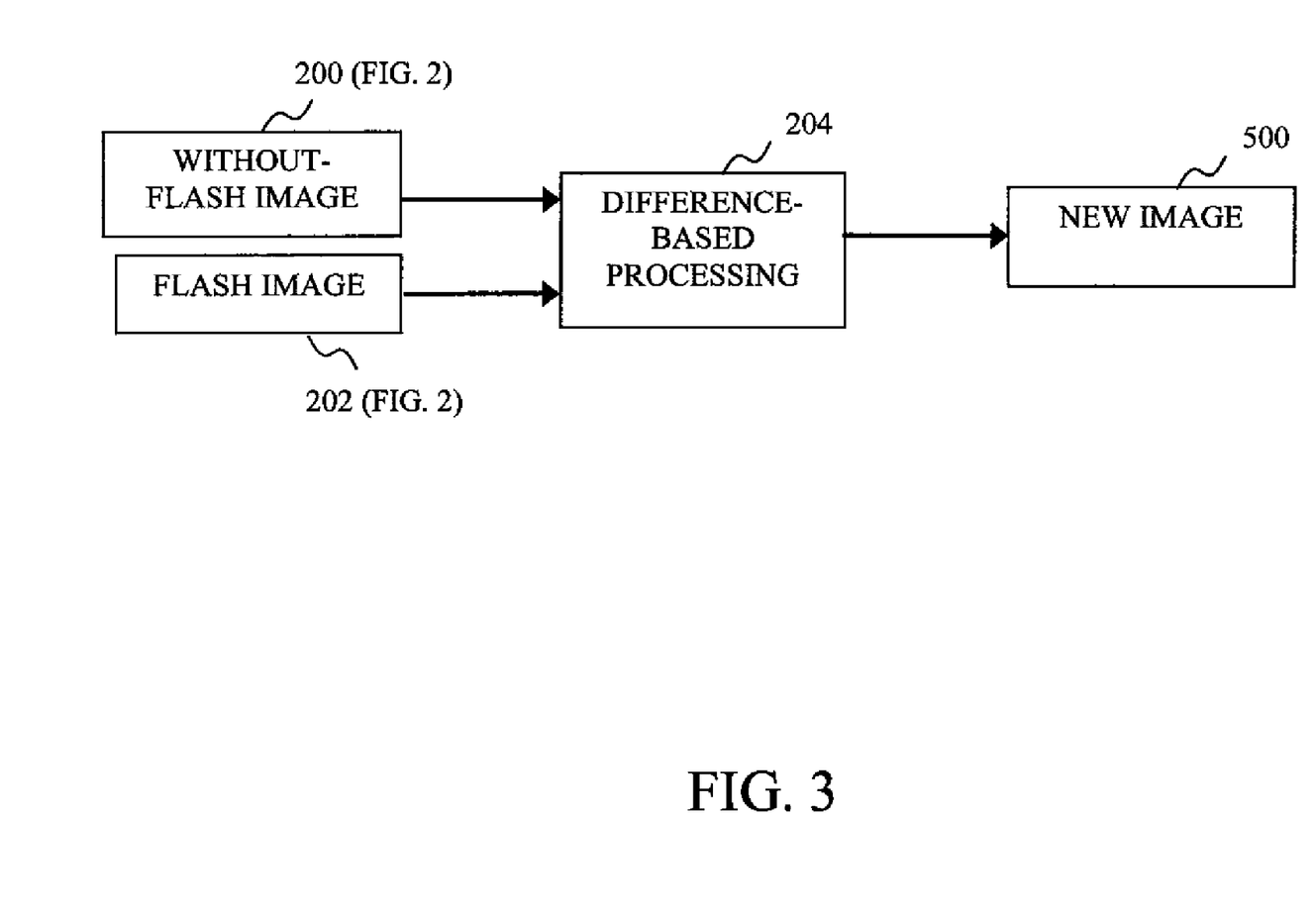
FIG. 3 is a block diagram of the difference-based processing.

FIG. 3 is a high level diagram of the preferred embodiment of the invention. The flash image 202 and without-flash image 200 are processed through a difference-based processing 204. The result is a new image 500.

Figure 4:
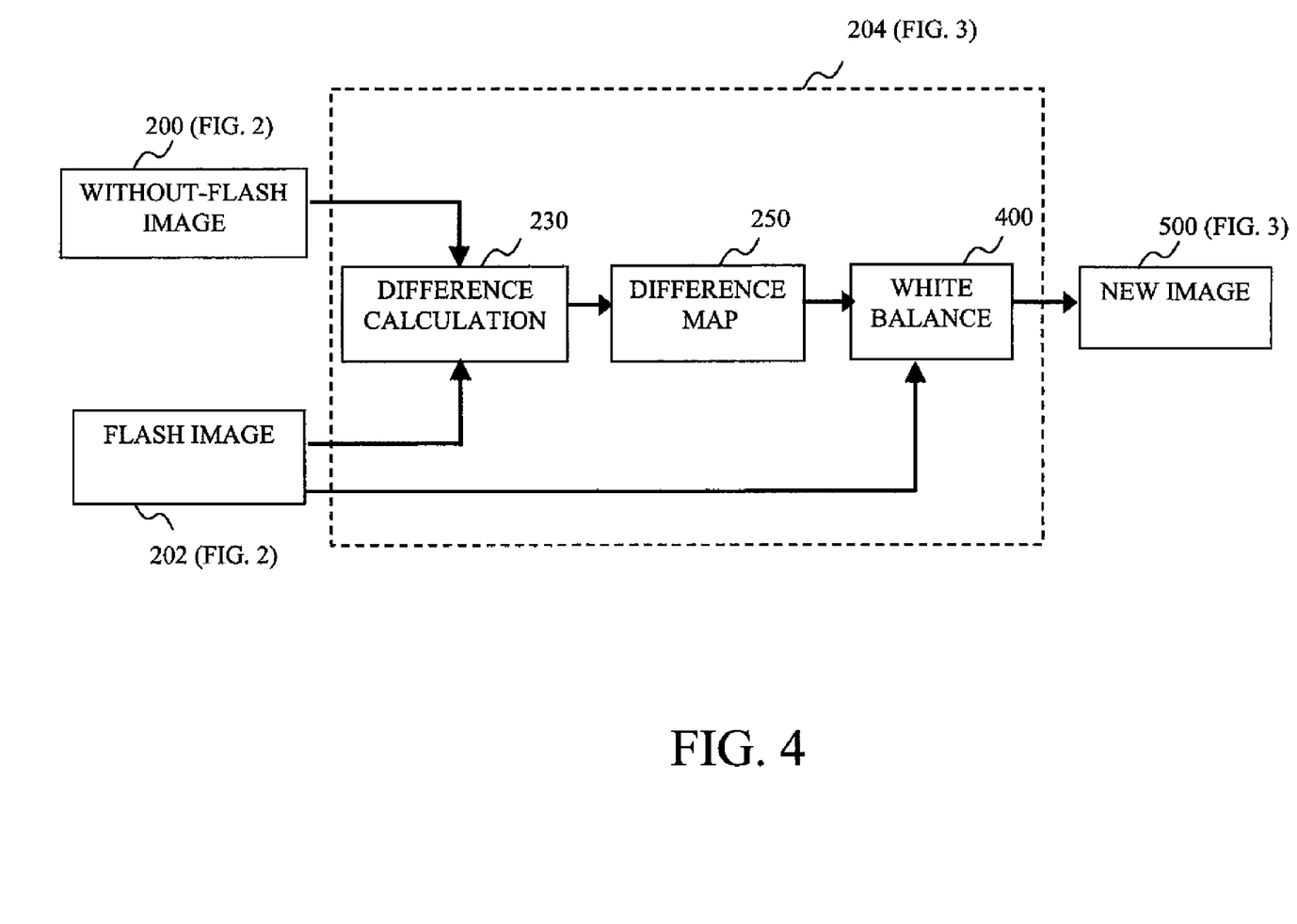
FIG. 4 is a more detailed block diagram of block 204 in FIG. 3.

Referring to FIG. 4, the difference-based processing 204 is subdivided into a difference calculation 230, a difference map 250 and a white balance 400.

Figure 5:
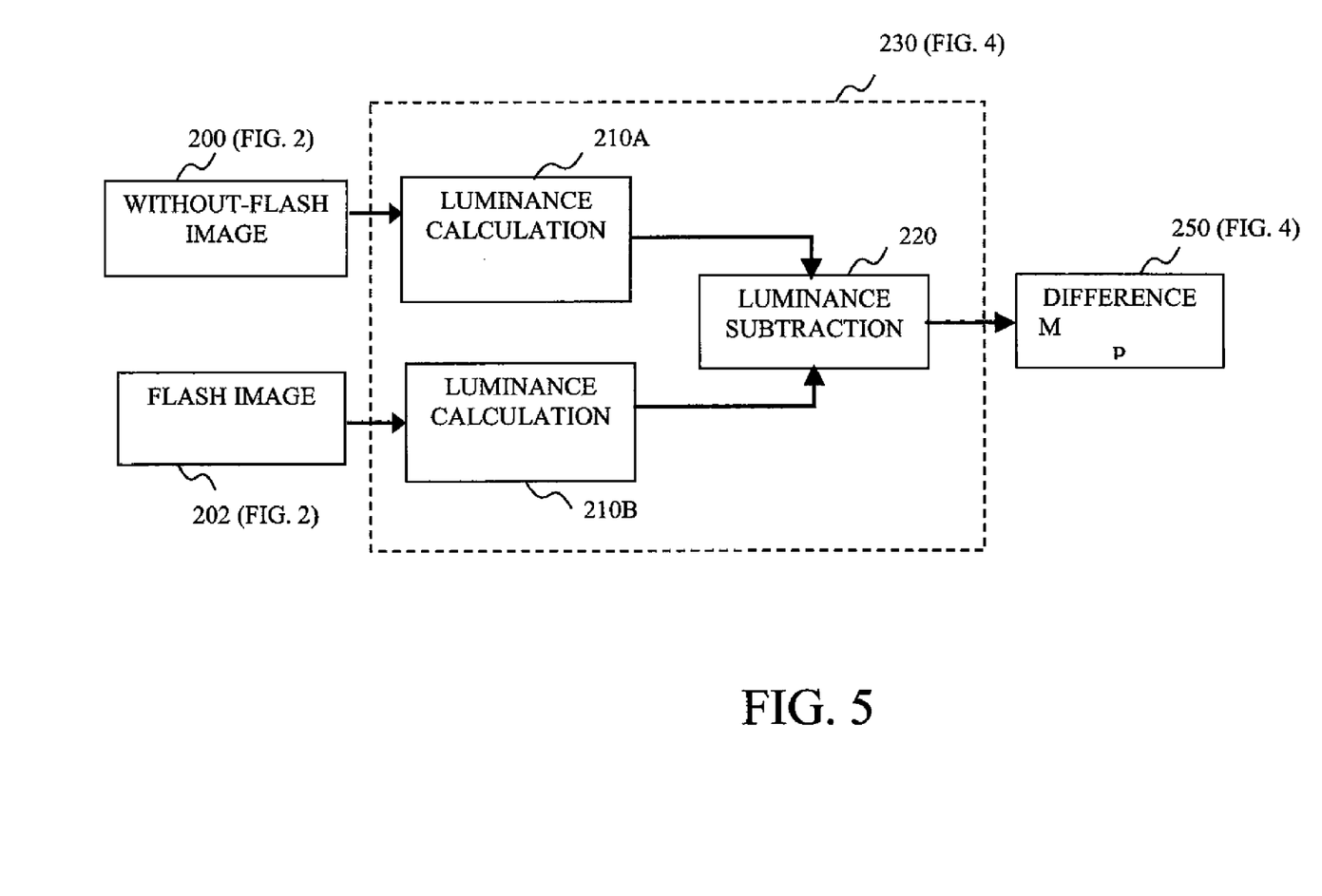
FIG. 5 is a more detailed block diagram of the difference calculation.
Figure 6A:
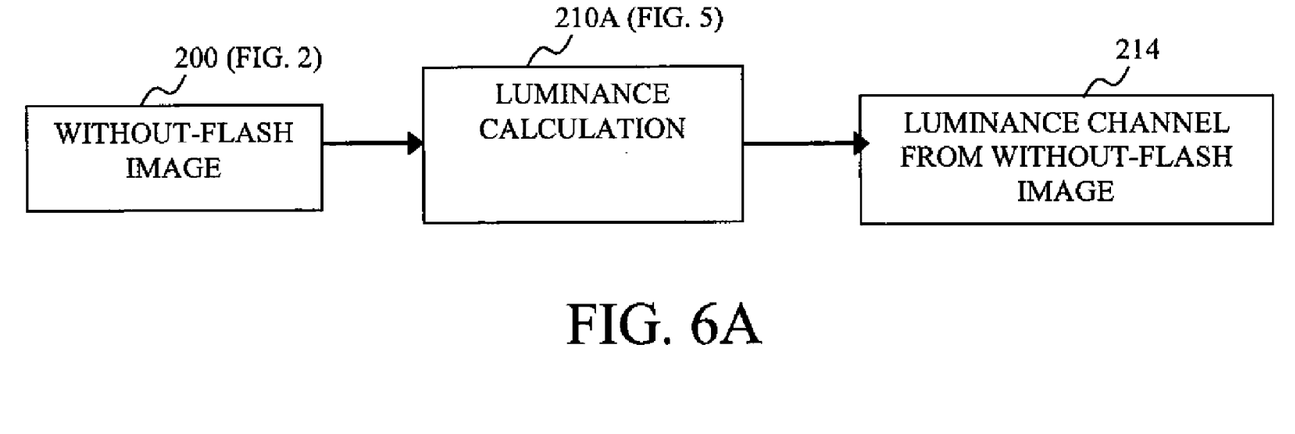
FIGS. 6A and 6B are block diagrams of the luminance channel calculation.
Figure 6B:
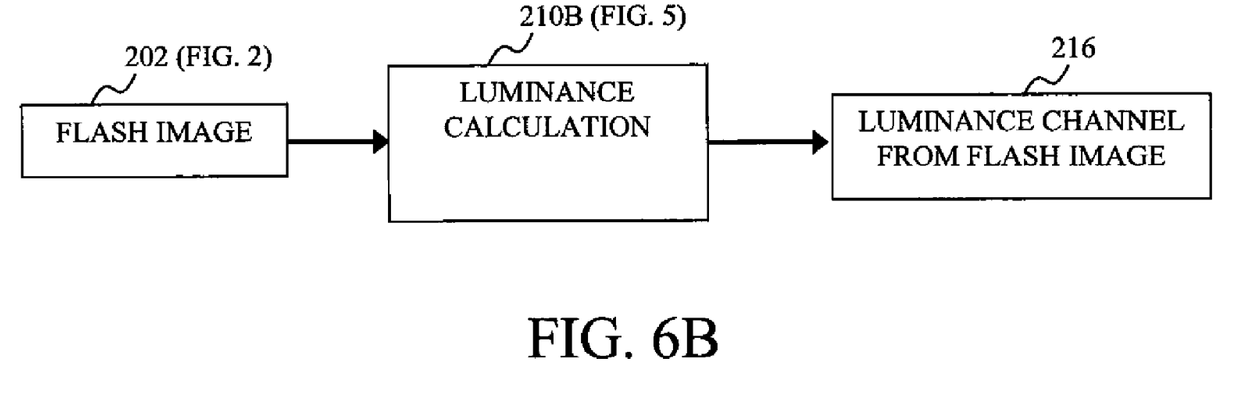

Referring to FIG. 5, the difference calculation 230 is subdivided into a luminance calculation 210A and 210B and a luminance subtraction 220. FIG. 6A and FIG. 6B are detailed diagrams of the use (or application) of luminance calculation 210A and luminance calculation 210B. The luminance calculation for the preferred embodiment, which assumes RGB flash image 202 and RGB without-flash image 200, is $$L=1000 \log_{10}(G+1)$$

where G=green channel and L=the luminance channel. It should be clear to others skilled in the art that other luminance calculations could be used.

Figure 7:
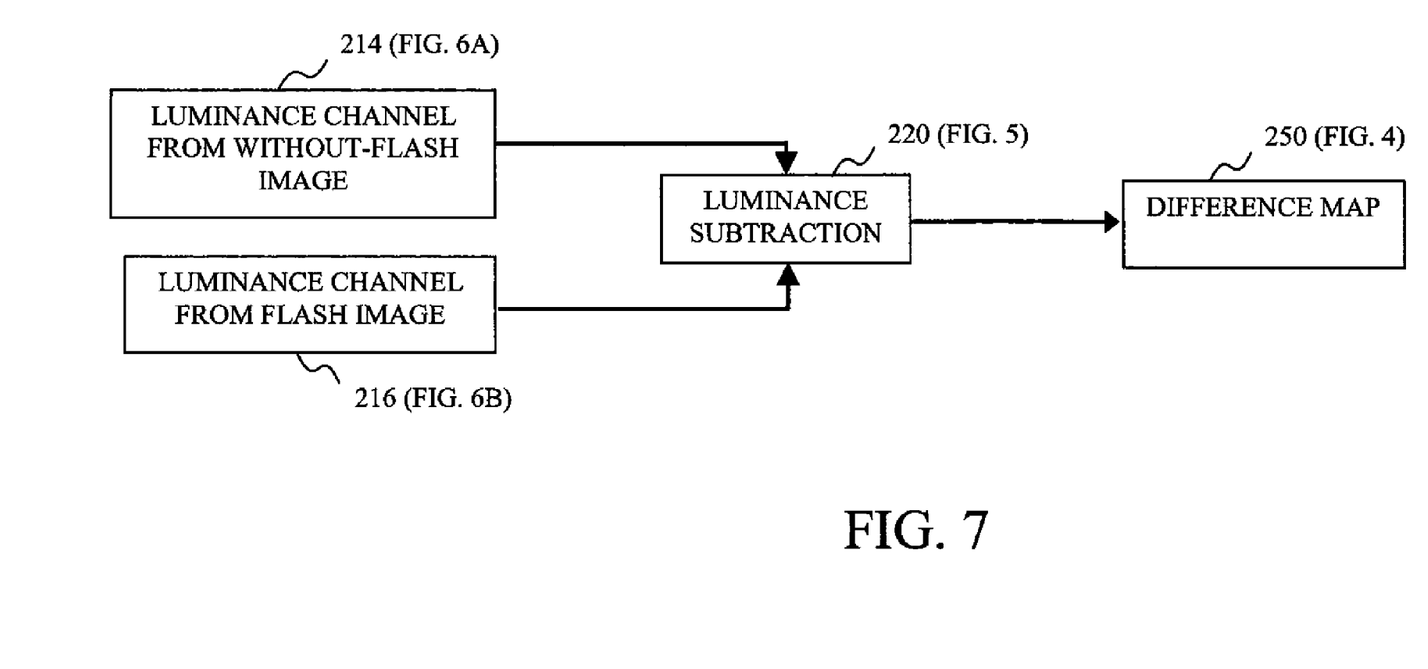
FIG. 7 is a block diagram of the luminance subtraction process.

Referring to FIG. 7, the output from the luminance calculation, luminance channel from without-flash image 214 and luminance channel from flash image 216, are sent to the luminance subtraction 220. The calculation for the preferred embodiment is $$L_{250}=L_{216}-L_{214}$$

where $L_{250}$ is the difference map 250 pixel value, $L_{214}$ is the luminance channel from without-flash image 214 pixel value and $L_{216}$ is the luminance channel from flash image 216 pixel value. The result of the luminance subtraction 220 is the difference map 250.

Figure 8:
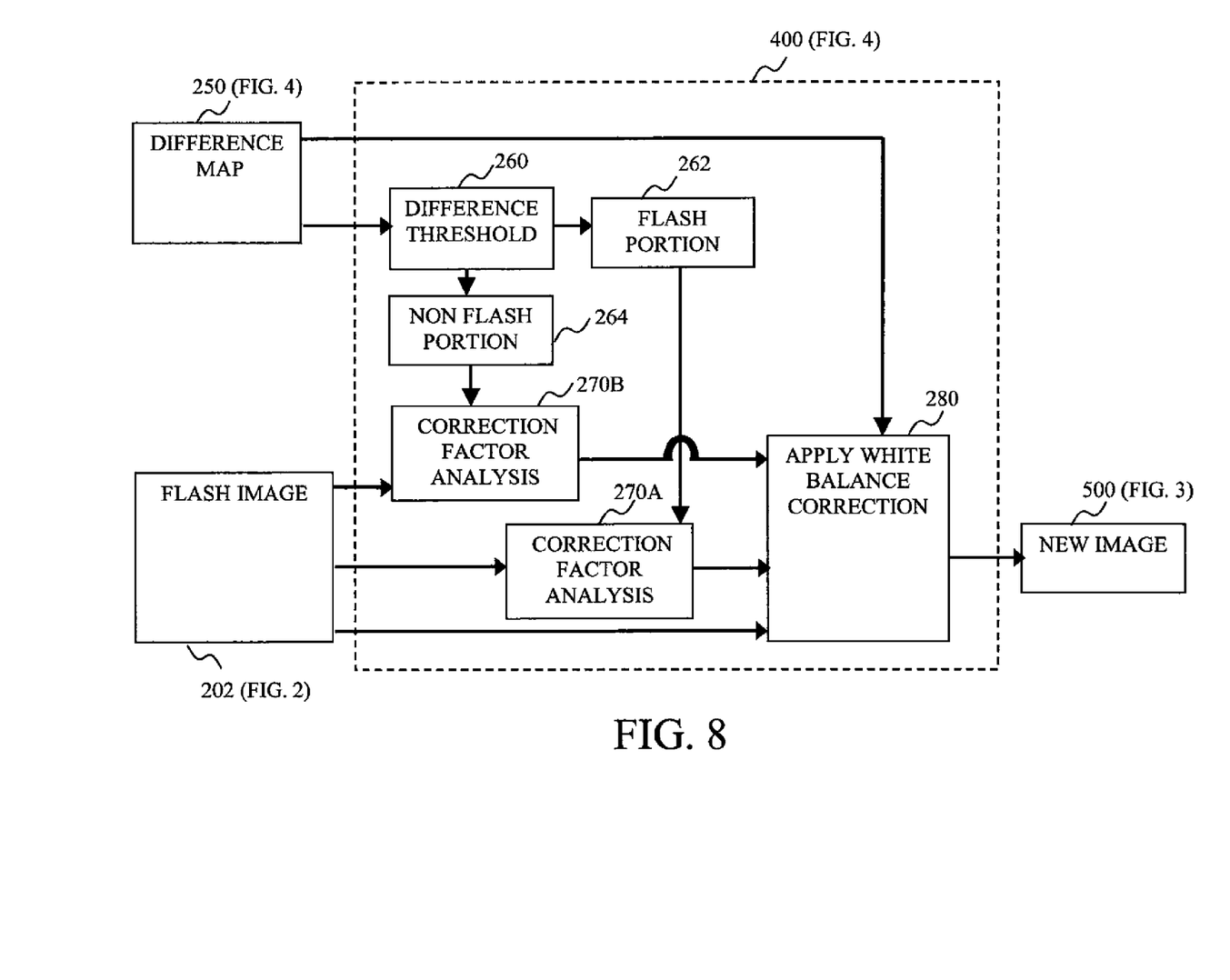
FIG. 8 is a block diagram of the white balance processing for the flash image.

FIG. 8 shows the details for the white balance 400. The white balance 400 is subdivided into a difference threshold 260, flash portion 262, correction factor calculation 270A and 270B, non-flash portion 264, and apply white balance correction 280. The difference threshold 260 separates the difference map 250 into the flash portion 262 and the non-flash portion 264.

Figure 9A:
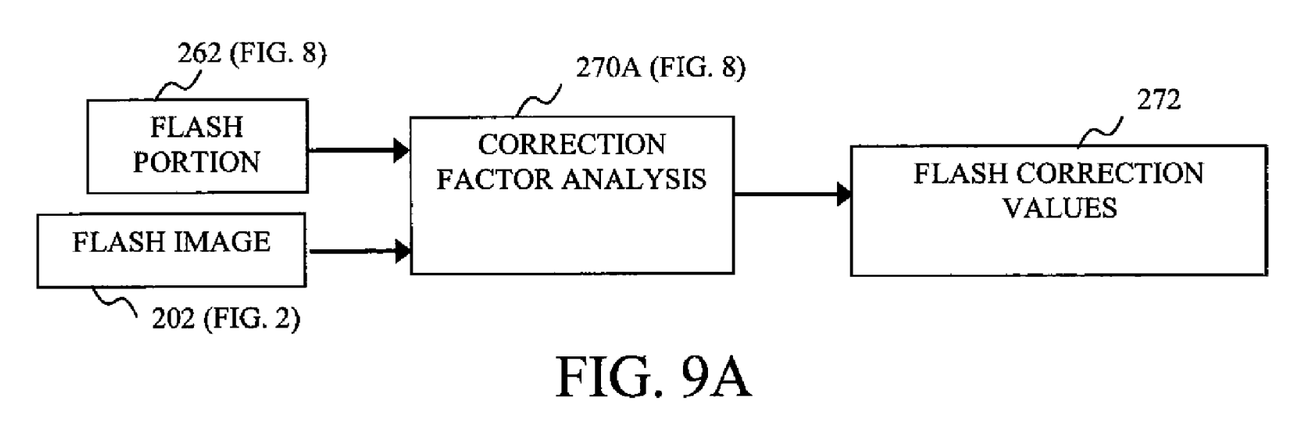
FIGS. 9A and 9B are block diagrams of the correction factor analysis.
Figure 9B:
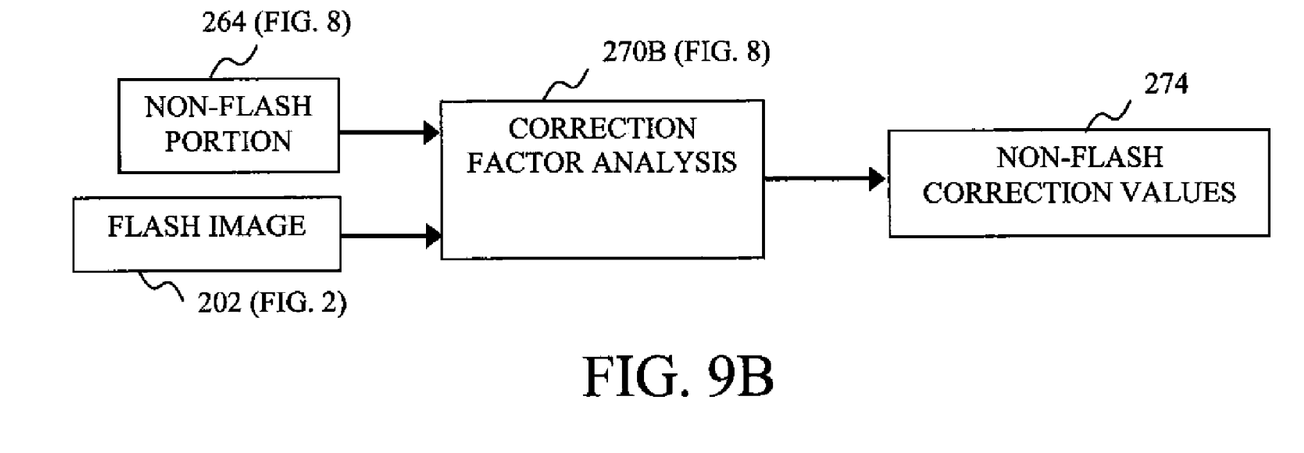

FIG. 9A and FIG. 9B give the details for the use of correction factor calculation 270A and 270B. The flash portion 262 of the flash image 202 is processed through the correction factor calculation 270A to give a flash correction values 272. The non-flash portion 264 of the flash image 202 is processed through the correction factor calculation 270B to give a non-flash correction values 274. The details of the correction factor calculation 270A and 270B can be as described in previously discussed U.S. Pat. No. 6,243,133. Other existing white balance algorithms can also be used in this capacity.

Figure 10:
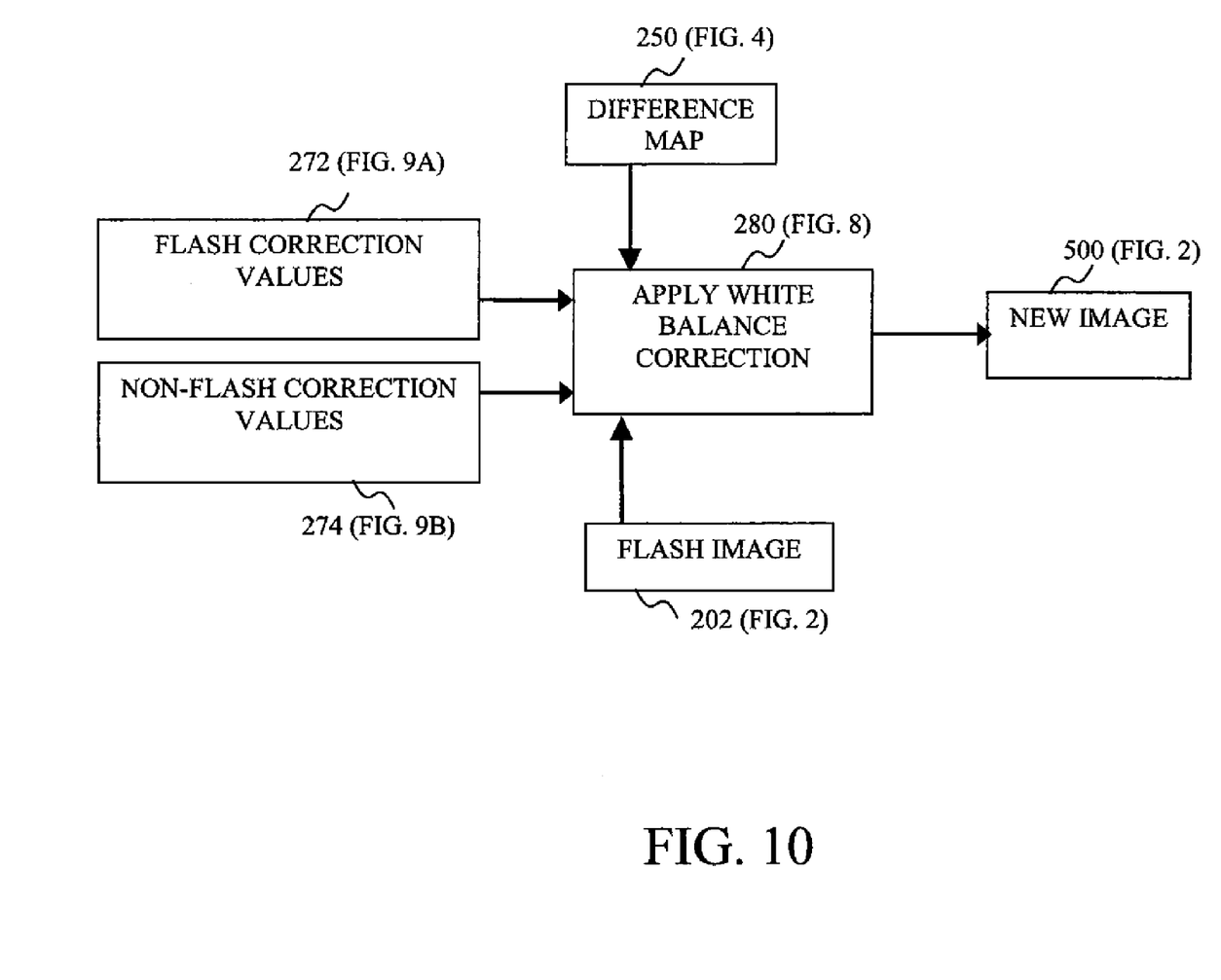
FIG. 10 is a block diagram of the apply white balance correction.

Returning to the preferred embodiment, FIG. 10 shows the details for applying white balance correction 280. The flash correction values 272, non-flash correction values 274, flash image 202 and difference map 250 are processed through the apply white balance correction 280. The result is the new image 500. The details of the white balance correction 280 can be as described in previously discussed U.S. Pat. No. 6,243,133. Other existing white balance algorithms can also be used in this capacity.

A second embodiment of this invention is for the difference map 250 values to be stored with the flash image 202 or without-flash image 200 as metadata to be used later.

The white balance correction algorithm disclosed in the preferred embodiment(s) of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell-phone that can be used as a processing unit, a display unit, or a unit to give processing instructions), and as a service offered via the World Wide Web.

In each case, the white balance algorithm can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithm can interface with a variety of workflow user interface schemes.

The white balance algorithm disclosed herein in accordance with the invention can have interior components that utilize various data detection and reduction techniques (e.g., face detection, eye detection, skin detection, flash detection)

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk-read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
200 Without-flash image
202 Flash image
204 Difference-based processing
210A Luminance calculation
210B Luminance calculation
214 Luminance channel from without-flash image
216 Luminance channel from flash image
220 Luminance subtraction
230 Difference calculation
250 Difference map
260 Difference threshold
262 Flash portion
264 Non-flash portion
270A Correction factor analysis
270B Correction factor analysis
272 Flash correction values
274 Non-flash correction values
280 Apply white balance correction
300 Scene
400 White balance
500 New image

The invention claimed is:

1. A method of enhancing the white balance of a digital image produced by a digital imaging device, comprising:
    (a) using the digital imaging device to capture at least two original digital images of the same scene with each digital image being under two different lighting conditions wherein the lighting conditions are flash and without-flash and producing for each such digital images a plurality of pixels;
    (b) using the pixel values of at least two of the digital images captured under different lighting conditions to produce a difference map representing a luminance difference between the flash and without-flash digital images;
    (c) selecting a threshold value to threshold the difference map separating the difference map into a flash portion and a non-flash portion;
    (d) partitioning the pixels in the flash image into pixel values that were affected by the flash corresponding to the flash portion of the difference map and pixel values that were not affected by the flash corresponding to the non-flash portion of the difference map; and
    (e) providing a first white balance modification to the pixel values of the flash image that were affected by the flash, and a second white balance modification to the pixel values of the flash image that were not affected by the flash so that an enhanced white balance digital image is produced, and wherein the first and second white balance modifications are not based on the pixel values of the without-flash digital image.

2. The method of claim 1 wherein the used pixel values of the digital images have a logarithmic relationship corresponding to the intensity of light received from the original scene.

3. The method of claim 1 wherein pixel values of the digital images have red, green, and blue components and the modifying step includes changing the color of the pixel values.

4. The method of claim 3 further including:
    (a) calculating a luminance pixel value from the red, green, and blue components respectively for the flash digital image and the without-flash digital image; and
    (b) calculating the difference values as the difference between corresponding luminance pixel values.

* * * * *